Aug. 25, 1953          N. TESSIER ET AL          2,649,981
                            HAND TRUCK
Filed March 13, 1951                          2 Sheets-Sheet 1
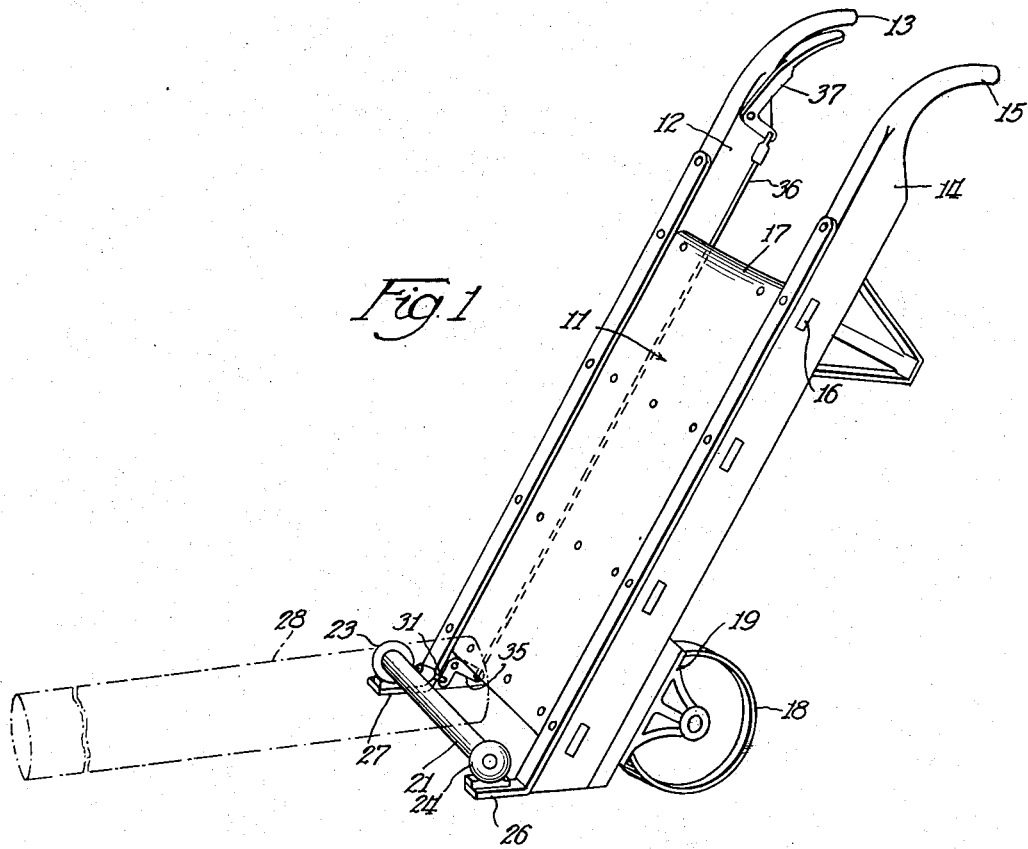
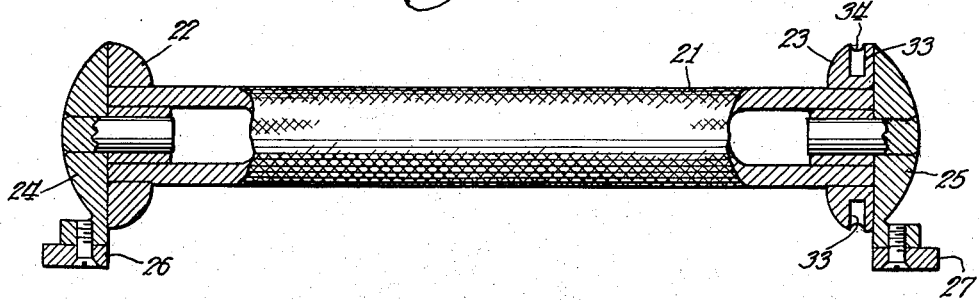
Inventors:
Nicklos Blacker
Noel Tessier
By: Attys.

Aug. 25, 1953
N. TESSIER ET AL
2,649,981
HAND TRUCK
Filed March 13, 1951
2 Sheets-Sheet 2
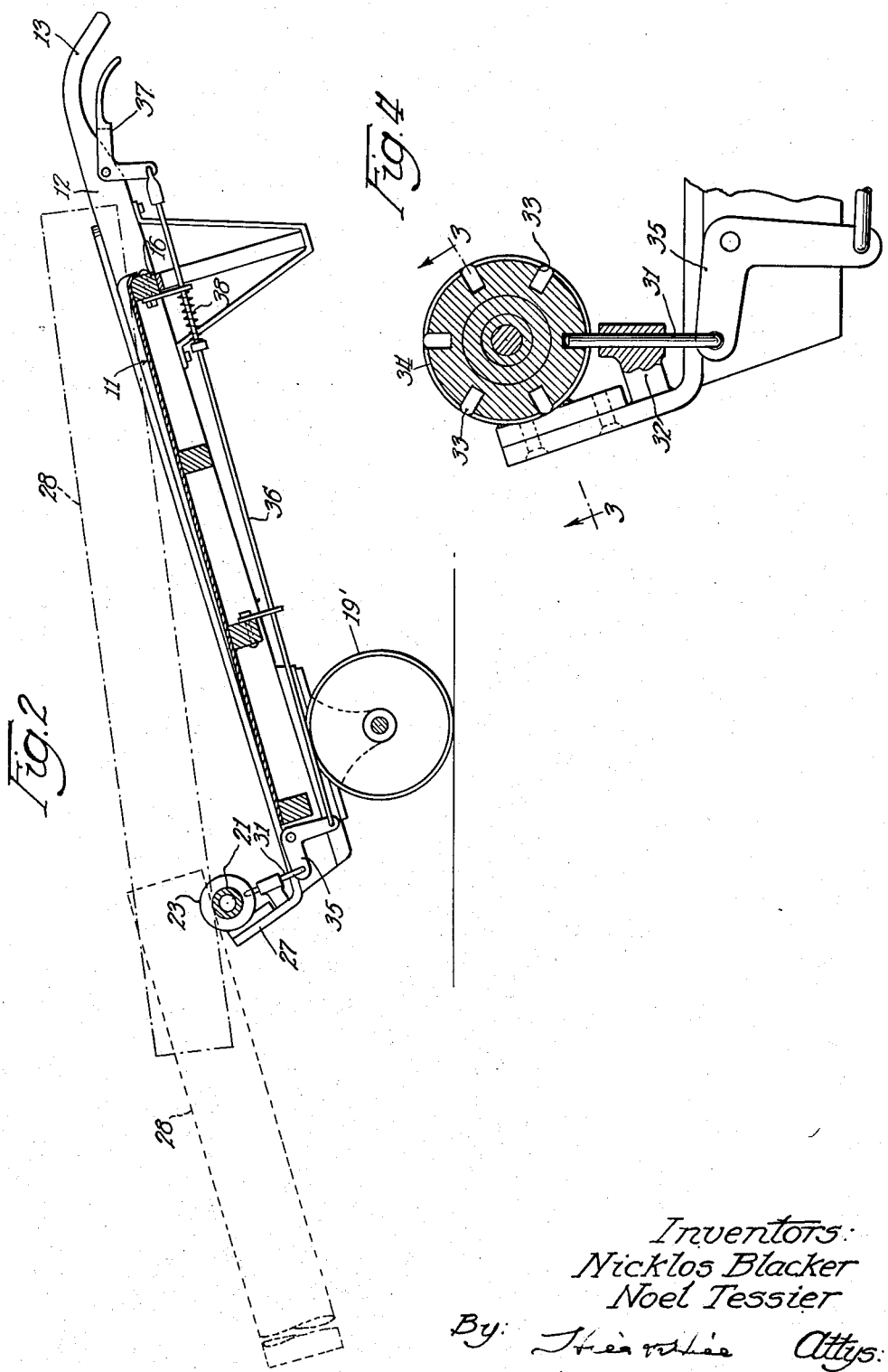
Inventors:
Nicklos Blacker
Noel Tessier
By:

Patented Aug. 25, 1953

2,649,981

UNITED STATES PATENT OFFICE 2,649,981

HAND TRUCK

Noel Tessier and Nicklos Blacker, Chicago, Ill.

Application March 13, 1951, Serial No. 215,226

1 Claim. (Cl. 214—350)

1

The present invention relates to a hand truck. More particularly the invention relates to a hand truck of the type used in transporting bulky objects which are relatively easy to break or rupture.

In the handling and transporting of easily ruptured, bulky objects, many factors combine to make the job a difficult one. For example, linoleum is bulky, heavy, and yet is not sufficiently sturdy so that it can be pried, hooked, or by some other similar operation moved onto known hand trucks, push carts, or the like, whereby it can be transported from one locality to another.

It is therefore one object of the present invention to provide a novel hand truck which will simplify the handling and transporting of bulky objects around warehouses.

Another object of the invention is to provide a novel hand truck which facilitates the loading and unloading of bulky objects on the load supporting platform thereof.

A further object of the invention is to provide a novel hand truck having means thereon which will facilitate the loading and unloading of bulky objects on the load supporting platform thereof, but which does not in any manner impair the operation of the hand truck as a transporting device.

A feature of the invention is the provision of a hand truck including a wheeled frame, a roller rotatably mounted on at least one end of the load supporting platform of the frame, and brake means mounted on the frame and operatively connected to the roller for selectively braking the same.

Other objects, features, and many of the attendant advantages of this invention will be appreciated readily as the same becomes understood by reference to the following detailed description when considered in connection with the accompanying drawings, wherein similar parts in each of the several figures are designated by the same reference numeral, and wherein:

Fig. 1 is a side perspective view of a novel hand truck constructed in accordance with the invention;

Fig. 2 is a sectional view of the hand truck shown in Fig. 1;

Fig. 3 is a side elevational view, partly in section, of a roller means mounted on the hand truck shown in Fig. 1; and Fig. 4 is a cross sectional view of the roller means shown in Fig. 3 illustrating the construction of the roller means and a braking means cooperating with the roller means.

Referring now to Fig. 1 of the drawings, the novel hand truck, which for the most part is of standard construction, includes a frame, indicated at 11, comprising a first member 12 having a handle portion 13, and a second member 14 having a handle portion 15. Second member 14 is parallel to and spaced from the first member 12, and is connected therewith by means of a plurality of cross bars 16 and a connecting web or load supporting platform portion 17. The load supporting platform portion 17 may have a recessed area centrally located therein to provide for retaining cylindrically-shaped objects, such as a roll of linoleum, properly centered on frame 11. In order that frame 11 be used as a transporting device, a pair of wheels, one of which is shown at 18, are rotatably mounted on opposite sides thereof by means of a pair of mounting brackets, one of which is shown at 19.

Mounted on the end of frame 11, adjacent the end thereof to which wheels 18 are secured, is an elongated roller 21 which is journaled on the load supporting surface of the frame. As best shown in Fig. 3, roller 21 comprises a hollow cylindrical body having a knurled surface and having a respective one of a pair of enlarged semi-spheres 22 and 23 secured to each of the ends thereof. Roller 21 is rotatably mounted on frame 11 by means of a pair of semi-spherically-shaped supports 24 and 25 which complementally co-act with the semi-spheres 22, 23, respectively, to provide a rounded barrier on each of the ends of roller 21, and which are preferably mounted on a pair of upwardly bent extensions 26 and 27 projecting beyond the ends of the members 12 and 13.

By reason of the provision of the roller 21 on the end of the load support platform 17 of the hand truck, the loading of bulky objects, such as a roll of linoleum indicated at 28, onto the load supporting platform of the hand truck is greatly facilitated. With a hand truck thus constructed, all that is required in order to load the object 28 onto the hand truck is that the end of the truck be inserted under the end of the object to be handled or transported in the manner shown in Fig. 1 of the drawings. The operator's end, or handle portion 13, 15 of the truck is then pushed downwardly so that object 28 may be easily rolled upon the load supporting platform of the truck in the manner shown in Fig. 2 of the drawings. During this operation the barrier formed by the co-acting semi-spheres on the end of the roller, serves to prevent the object from rolling off the end of the roller. While it is apparent that the provision of roller 21 greatly facilitates the loading of bulky objects on the load supporting platform of the hand truck, it can be appreciated that an object, such as the roll of linoleum indicated at 28, would not be securely retained on a truck while being transported due to the fact that one of its ends is supported by the roller and would tend to slide off of the truck.

To overcome the above objection, a brake means for selectively braking the roller 21 is provided. As is best shown in Fig. 4 of the drawings, the brake means preferably includes a pin 31 supported on the end of frame 11 by means of a collar 32. Pin 31 is adapted to be extended into any one of a plurality of apertures 33 formed around the periphery of the semisphere 23 secured to the end of roller 21, and is guided into engagement with any desired one of the apertures 33 by means of a peripheral groove 34 formed in the semi-sphere 23. The end of pin 31 opposite the aperture engaging end thereof is connected to one leg of a bell crank 35 pivotally mounted on frame 11. The remaining leg of bell crank 35 is connected to a connecting link 36 which is in turn connected to one leg of a second bell crank 37 pivotally mounted on the handle portion 13 of frame 11. The remaining leg of bell crank 37 is shaped to form an operating handle for the brake means thus formed. Connecting link 36 is normally biased by a compression spring 38 which serves to retain pin 31 in engagement with one of the apertures 33 when the operating handle portion of crank 37 is not compressed.

By reason of the above construction, rotation of the roller 21 may be prevented when a load 28 is supported on the hand truck in the manner shown in Fig. 2. To utilize the roller 21 when loading the object on the hand truck, all that is required is that the operating handle portion of bell crank 37 be compressed against the handle portion 13 of the hand truck. This action results in pulling pin 31 out of engagement with the aperture in which it had been inserted, and allows roller 21 to rotate freely on its support. The object 28 may then be easily rolled on, or rolled off of the load supporting platform 17 of the hand truck.

From the foregoing description, it can be appreciated that the invention provides a novel hand truck which greatly simplifies the handling and transporting of bulky objects in that the loading and unloading of such objects on the load supporting platform of the truck is facilitated by the provision of a roller on the end of the load supporting platform of the truck. Because of the provision of brake means for selectively braking the above mentioned roller, the roller may be utilized without impairing the normal operation of the hand truck as a transporting device. Consequently, it can be appreciated that the invention provides a new and novel hand truck which will greatly improve the presently known methods of handling and transporting bulky goods.

Having thus described our invention, it is obvious that various immaterial modifications may be made in the same without departing from the spirit of our invention; hence, we do not wish to be understood as limiting outselves to the exact form, construction, arrangement, and combination of parts herein shown and described, or uses mentioned.

What we claim as new and desire to secure by Letters Patent is:

A hand truck including in combination a frame comprising a pair of spaced parallel members having handle portions and joined together by an interconnecting load supporting portion, said load supporting portion having a recessed area for retaining tubular loads in place, wheels rotatably mounted on the ends of said members opposite said handle portions, an elongated roller having a knurled surface rotatably mounted on said members on the ends thereof adjacent said wheels, said roller having a plurality of apertures spaced about the periphery thereof, and brake means for said roller comprising a pin adapted to be extended into said apertures for selectively preventing rotation of said roller, a bell crank pivotally mounted on said frame and having one of the legs thereof connected to said pin, a connecting link operatively connected to the remaining leg of said bell crank, a second bell crank pivotally mounted on the handle portion of one of said members, said second bell crank having one of the legs thereof formed as a handle grip and the remaining leg thereof operatively connected to said connecting link, and a compression spring operatively connected to said connecting link for normally biasing said pin into engagement with one of the apertures in said roller.

NOEL TESSIER.
NICKLOS BLACKER.

References Cited in the file of this patent

UNITED STATES PATENTS

| Number | Name | Date |
|---|---|---|
| 73,398 | Smith | Jan. 14, 1868 |
| 365,530 | McFaul | June 28, 1887 |
| 775,997 | Streich | Nov. 29, 1904 |
| 1,096,350 | Brown | May 12, 1914 |
| 1,361,728 | Holdefer | Dec. 7, 1920 |
| 1,407,235 | Taylor | Feb. 21, 1922 |
| 1,439,257 | Ogren | Dec. 19, 1922 |
| 2,227,624 | Benbow et al. | Jan. 7, 1941 |
| 2,569,118 | Sherman | Sept. 25, 1951 |

FOREIGN PATENTS

| Number | Country | Date |
|---|---|---|
| 234,187 | Great Britain | May 25, 1925 |